United States Patent
Amamiya et al.

(10) Patent No.: US 8,650,945 B2
(45) Date of Patent: Feb. 18, 2014

(54) RETENTION MEMBER ON VALVE STEM SEALING GROMMET

(75) Inventors: Yutaka Amamiya, Novi, MI (US); Seunghun Choe, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 129 days.

(21) Appl. No.: 13/416,156

(22) Filed: Mar. 9, 2012

(65) Prior Publication Data

US 2013/0233069 A1    Sep. 12, 2013

(51) Int. Cl.
    *B60C 23/02*    (2006.01)
(52) U.S. Cl.
    USPC ............................................ 73/146.8; 73/146
(58) Field of Classification Search
    None
    See application file for complete search history.

(56) References Cited

U.S. PATENT DOCUMENTS

| 4,335,283 A | * | 6/1982 | Migrin | 200/61.25 |
| 4,411,302 A | * | 10/1983 | Kuypers | 152/427 |
| 4,760,860 A | * | 8/1988 | Madrona | 137/223 |
| 5,027,848 A | * | 7/1991 | Leeuwen | 137/227 |
| 5,977,870 A | * | 11/1999 | Rensel et al. | 340/447 |
| 7,145,443 B2 | * | 12/2006 | Ito et al. | 340/442 |
| 7,454,965 B2 | * | 11/2008 | Blossfeld et al. | 73/146 |
| 7,694,557 B2 |   | 4/2010 | Hettle et al. |  |

* cited by examiner

*Primary Examiner* — Lisa Caputo
*Assistant Examiner* — Jermaine Jenkins
(74) *Attorney, Agent, or Firm* — Young, Basile, Hanlon & MacFarlane, P.C.

(57) ABSTRACT

A valve stem connectible to a tire pressure sensor includes a valve stem body and a grommet attached to the valve stem body. The grommet includes a first flange and a second flange extending radially outward from the valve stem body. A retention member attached to the valve stem body includes a base member and a standoff extending from the base member. The standoff is selectively moveable between a first position in which a distal end of the standoff is disposed at a first radial distance from a longitudinal axis of the valve stem body, and a second position in which the standoff is disposed at a second radial distance from the longitudinal axis, the first radial distance being greater than the second radial distance. An outer peripheral edge of the second flange is disposed at a third radial distance that is less than the first radial distance.

17 Claims, 3 Drawing Sheets

RETENTION MEMBER ON VALVE STEM SEALING GROMMET

BACKGROUND

Vehicles are used for transporting people and cargo over land, water and through the air. Vehicles designed for land travel employ various mechanisms to apply steering and driving forces to the ground. Land vehicles may broadly be classified as wheeled, tracked, railed or skied, depending on the mechanism used to apply the steering and driving forces. A wheeled vehicle, for example, may employ wheel assemblies rotatably mounted on an axle attached to the vehicle. The wheel assembly enables the vehicle to move through rotation of the wheel assembly about the axle. A driving force may be applied to one or more of the wheel assemblies to propel the vehicle. The driving force may be generated by a power source, such as an internal combustion engine or electric motor.

Wheel assemblies for use on land vehicles are designed to handle the steering and driving forces normally encountered when operating the vehicle, and to absorb impact forces that may occur as the wheel assembly travels over imperfections in the road surface. The wheel assemblies may include a pneumatic tire mounted on a rim of a wheel. The wheel may be attached to a hub on a vehicle axle.

The tire may be pressurized with air or another gas, such as nitrogen, to provide buoyancy for supporting the vehicle load and cushioning for absorbing shocks caused by imperfections in the road. Air for inflating the tire may be introduced through a valve stem attached to an opening in the wheel adjacent the rim. The valve stem may include a valve that may be opened to admit pressurized gas (i.e., air) to an interior region of the tire, and which automatically closes and is kept sealed by the interior tire pressure, a spring, or both, to prevent the gas from escaping. The valve stem may include a flexible grommet that seals the valve stem against the wheel to prevent pressurized gas from escaping the tire. The valve stem may be assembled to the wheel by inserting the valve stem through the valve stem opening in the wheel from inside the wheel.

The tire may be inflated to a recommended pressure selected to provide a desired balance between vehicle performance and handling, ride quality, and tire life. For example, an underinflated tire may provide a vehicle operator with a softer ride by decreasing tire stiffness, but may also negatively impact vehicle handling and fuel mileage. Under-inflation may also result in premature tire wear and diminished tire performance in certain operating conditions. Overinflating a tire, on the other hand, may increases tire stiffness and result in a firmer ride. Over-inflation may also have a detrimental effect on tire life and result in decreased tire performance under certain operating conditions.

To monitor and help maintain a tire at a recommended inflation pressure, and to alert a vehicle operator of an extreme under-inflation condition, a tire pressure monitoring system (TPMS) may be employed to automatically monitor the inflation pressure. A TPMS electronically monitors a tire inflation pressure. A TPMS may also be referred to as a tire-pressure indication system (TPIS). A TPMS reports real-time tire pressure information to a vehicle operator, typically via a gauge, a pictogram display, or a simple low-pressure warning light. A TPMS may employ a pressure sensor mounted internally within the tire for measuring the tire inflation pressure. The collected pressure data may be transmitted to the vehicle's instrument cluster or a corresponding monitor for viewing by the vehicle operator. Data may be transmitted from the pressure sensor to the monitor or display via a battery powered radio-frequency (RF) communication device. The pressure sensor is generally fitted to the wheel or to the in-tire portion of the valve stem when the tire is mounted to the rim of the wheel.

SUMMARY

The disclosed embodiments include a valve stem assembly for a tire pressure monitoring system. In one embodiment, the valve stem includes a valve stem body having an attachment end connectable to a tire pressure sensor and an opposite air transfer end. A grommet is attached to the valve stem body. The grommet includes a first flange and a second flange having an outer peripheral edge. The first and second flanges extend generally radially outward from the valve stem body. The first flange is disposed between the second flange and the attachment end of the valve stem body. A retention member is attached to the valve stem body and includes a base member and a standoff having a proximal end connected to the base member and an opposite distal end. The standoff is selectively moveable between a first position in which the distal end of the standoff is disposed at a first radial distance from a longitudinal axis of the valve stem body, and a second position in which the distal end is disposed at a second radial distance from the longitudinal axis of the valve stem body, the first radial distance being greater than the second radial distance. The outer peripheral edge of the second flange may be located at a third radial distance that is less than the first radial distance between the distal end of the standoff and the longitudinal axis of the valve stem body when the standoff is arranged in the first position.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
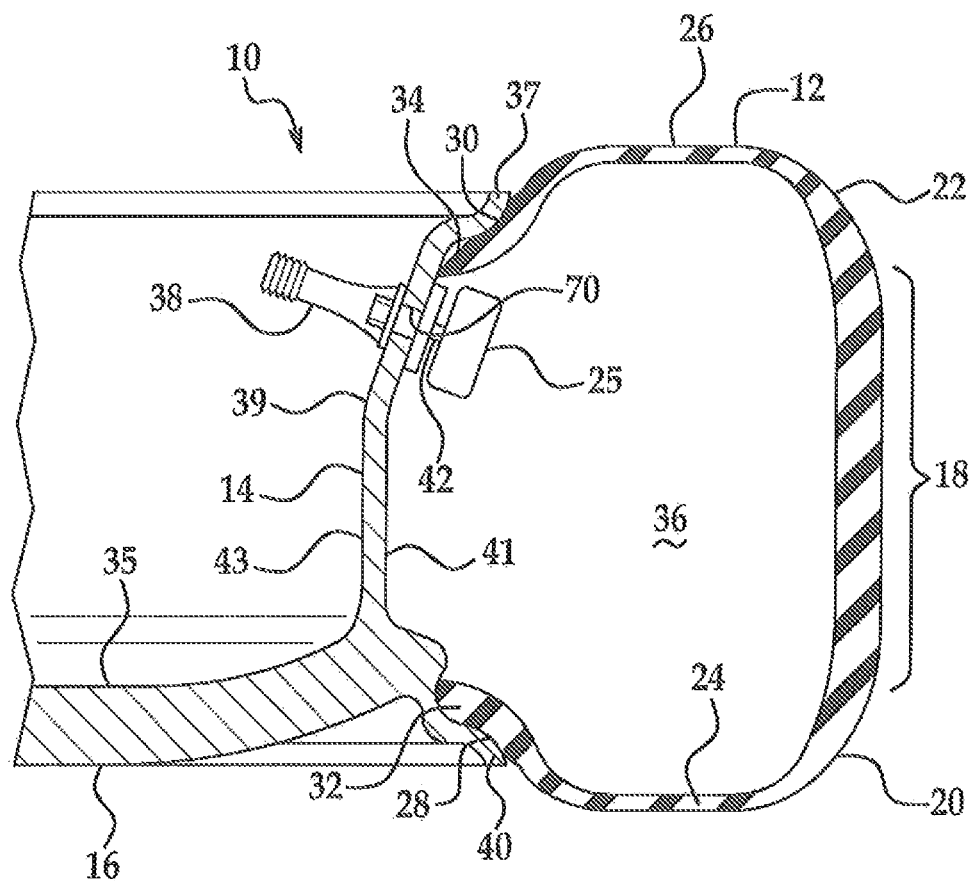
FIG. 1 is a partial cross-sectional view of a vehicle wheel assembly employing an exemplary valve stem having a retention member.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

With reference to FIG. 1, an exemplary wheel assembly 10 may include a pneumatic tire 12 mounted on a rim 14 of a wheel 16. The terms "wheel" and "rim" may have inconsistent and overlapping meanings within the industry. For example, it is not uncommon for the terms "wheel" and "rim" to be used synonymously to refer to the entire component to which the tire attaches. Decorative wheels, in particular, are often referred to as "rims". The term "rim" has also been used more narrowly to refer specifically to the outer circumferential portion of the wheel that adjoins the tire. To avoid confusion, the term "wheel" shall be used throughout this application to refer to the entire component to which the tire attaches, and generally includes an inner hub to which an outer rim is attached. The term "rim" refers specifically to the outer circumferential region of the "wheel" that adjoins the tire. The term "wheel assembly" refers to the combination wheel and tire assembly.

With continued reference to FIG. 1, tire 12 includes a tread region 18 that contacts the road surface. Tread region 18 includes various geometrically shaped grooves, lugs and voids that cooperate to channel away water and provide traction under various operating conditions. An inner shoulder 20 and outer shoulder 22 generally delineate lateral edges of tread region 18. Extending radially inward from shoulders 20 and 22 is an inner sidewall 24 and an opposite outer sidewall 26, respectively. Inner sidewall 24 includes an inner bead 28 formed proximate an inner circumferential edge 32 of inner sidewall 24. Outer sidewall 26 includes an outer bead 30 formed proximate an inner circumferential edge 34 of outer sidewall 26. Beads 28 and 30 cooperatively engage rim 14 of wheel 16 to form a generally airtight seal between tire 12 and wheel 16. Tire 12 may be constructed from a flexible elastomer material, such as rubber, with reinforcing materials such as fabric and wire.

Wheel 16 generally includes a hub 35 that connects to and extends radially inward from rim 14. Hub 35 includes features for connecting wheel 16 to a vehicle axle. Attached to an outer perimeter of hub 35 is the generally cylindrically shaped rim 14 to which tire 12 attaches. An outer end 37 of rim 14 engages outer bead 30 of tire 12 and an inner end 40 of rim 14 engages inner bead 28 when tire 12 is mounted to rim 14. Rim 14 includes a wall 39 that extends between ends 37 and 40, and includes an inner surface 41 and an outer surface 43. Tire 12 and inner surface 41 of rim 14 together define and interior region 36 for receiving a pressurized gas, such as air or nitrogen, for inflating tire 12 to a desired inflation pressure.

Wheel 16 may be constructed from multiple stamped, cast and forged parts assembled together to form wheel 16, or may be formed as one continuous part. Wheel 16 may be made from a wide variety of materials, including but not limited to, steel, aluminum and magnesium alloys, and composites.

Tire 12 may be inflated to a desired inflation pressure by introducing a pressurized gas to interior region 36 of tire 12 through a valve stem 38. Valve stem 38 includes a valve 51 (see FIG. 3) that opens to admit the pressurized gas (i.e., air) into interior region 36 of tire 12 to inflate the tire. The valve is generally configured to automatically close and maintain a generally airtight seal in response to pressure within tire 12, a spring, or both, to prevent the gas from escaping. A Schrader valve is an example of one such valve. Schrader valves (also known as American valves) include a valve body into which a poppet valve is threaded with a spring attached. Schrader valves are commonly used in connection with automobile tires.

The inflation pressure of tire 12 may be monitored through use of a tire pressure monitoring system (TPMS), which may be configured to detect a pressure within interior region 36 of tire 12. A TPMS may alternately be referred to as a tire pressure indication system (TPIS). For purposes of discussion, it shall be understood that reference throughout the application to a TPMS system shall also cover a tire pressure indication system (TPIS), as well as other pressure monitoring systems.

Continuing to refer to FIG. 1, a TPMS typically includes a pressure sensor 25 that operates to collect pressure data and transmit the data real-time to an associated receiver. The receiver may display the data to a vehicle operator via a pictogram display, or a simple low-pressure warning light. Pressure sensor 25 may be installed within interior region 36 of tire 12. Pressure sensor 25 may be attached to wheel 16 or to an in-tire region 42 of valve stem 38, for example, as illustrated in FIG. 1.

Figure 2:
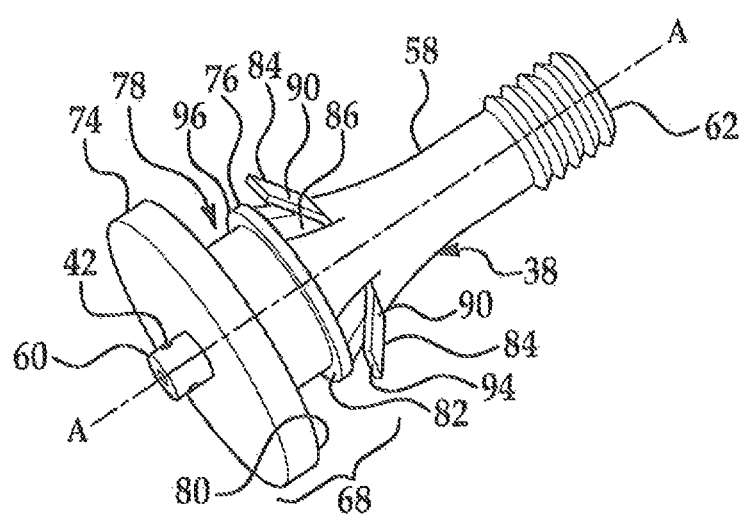
FIG. 2 is a perspective view of the valve stem of FIG. 1 shown removed from the wheel assembly.
Figure 3:
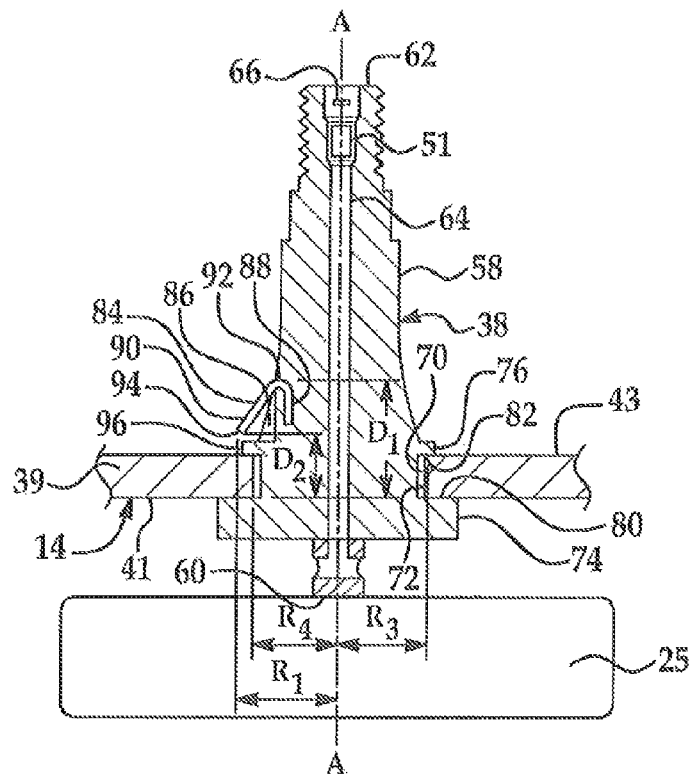
FIG. 3 is a partial cross-sectional view of the valve stem of FIG. 2 shown attached to the wheel assembly.

With reference to FIGS. 1-3, valve stem 38 includes a valve stem body 58 having a longitudinal axis A-A. Valve stem body 58 includes an attachment end 60 and an air transfer end 62 arranged at opposite ends of the valve stem body. A fluid passage 64 extends longitudinally through valve stem body 58 between attachment end 60 and the air transfer end 62. Disposed within fluid passage 64 is valve 51 for selectively controlling a flow of air (or another gas used to inflate tire 12) through passage 64. Valve 51 may be arranged anywhere within passage 64, including proximate air transfer end 62. Valve 51 may include various configurations, including for example, Schrader and Presta valves. For purposes of discussion, valve 51 is schematically illustrated in the drawing figures as a Schrader type valve, but in practice, another differently configured valve may also be employed.

Valve 51 is selectively moveable between an open position, in which air (or another gas) is allowed to flow through passage 64 between air transfer end 62 and attachment end 60, and a closed position, in which the flow of air though passage 64 is substantially blocked. Valve 51 may include a biasing member, such as a spring, for biasing valve 51 toward the closed position. Valve 51 may be moved toward the open position by depressing a plunger 66. Releasing plunger 66 allows the biasing member and/or pressurized air within tire 12 to return valve 51 to the closed position.

With continued reference to FIGS. 1 thru 3, valve stem 38 may include a grommet 68 for attaching valve stem 38 to a valve stem opening 70 in wall 39 of wheel 16. Valve stem opening 70 extends entirely through wall 39 of wheel 16. A sidewall 72 of valve stem opening 70 extends between inner surface 41 and outer surface 43 of wall 39. Grommet 68 forms a substantially airtight seal between valve stem body 58 and wall 39 of wheel 16 to substantially prevent pressurized air from escaping interior region 36 of tire 12.

Grommet 68 may include a pair of opposing flanges that engage inner and outer surfaces 41 and 43 of wall 39 for securing valve stem 38 to wheel 16. A first flange 74 may be positioned proximate attachment end 60, and a second flange 76 may be positioned longitudinally along longitudinal axis A-A of valve stem body between first flange 74 and air transfer end 62. Flanges 74 and 76 extend generally radially outward from valve stem body 58. Flanges 74 and 76 are separated from one another and define opposite sides of a circumferential groove 78 extending around a perimeter of valve stem body 58 for receiving wall 39 of wheel 16. A surface 80 of first flange 74 engages inner surface 41 of wheel 16 and a surface 82 of second flange 76 engages outer surface 43 of wall 39 when grommet 68 is fully seated within valve stem opening 70. Grommet 68 may be made from a generally flexible resilient material to enable grommet 68 to elastically conform to the contour of wall 39.

With continued reference to FIGS. 2 and 3, valve stem 38 may include one or more elastic retention members 84 positioned around a perimeter of valve stem body 58. Each retention member 84 may be arranged within a corresponding recessed region 86 formed in second flange 76. Retention member 84 may include a base member 88 attached to valve stem body 58 at a location between surface 82 of second flange 76 and air transfer end 62 of valve stem body 58. Base member 88 may be aligned generally parallel to longitudinal axis A-A of valve stem 38. Extending from base member 88 is a standoff 90 having a proximal end 92 attached to base member 88 and an opposite distal free end 94. Proximal end 92 of standoff 90 is arranged axially along longitudinal axis A-A between distal end 94 of standoff 90 and air transfer end 62 of valve stem body 58. Proximal end 92 is located a distance $D_1$ from first flange 74 that is greater than a distance $D_2$ that distal end 94 is located from first flange 74. Standoff 90 extends generally radially outward at an oblique angle from base member 88 so as to be angled away from air transfer end 62 of valve stem 38.

Figure 4:
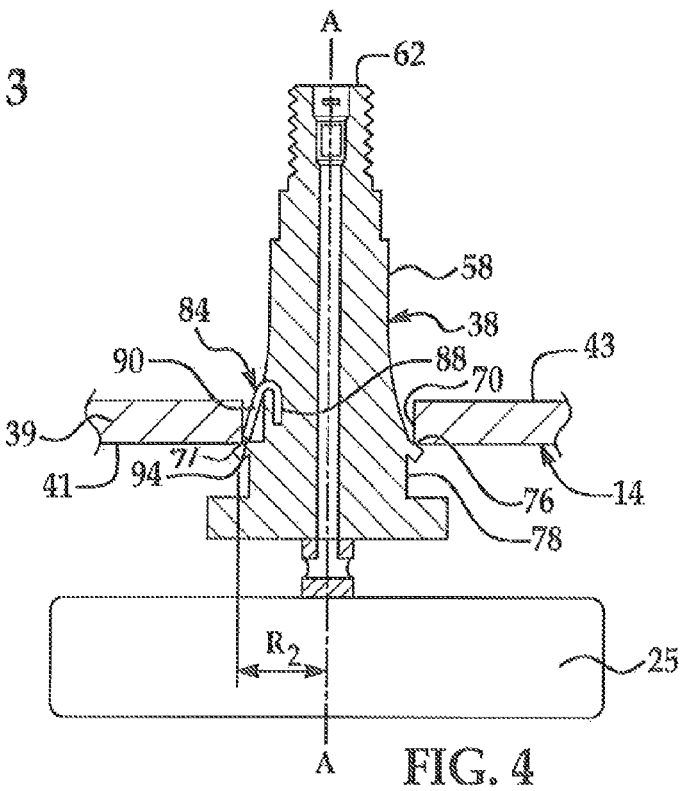
FIG. 4 is a partial cross-sectional view of the valve stem of FIG. 2 shown being assembled to the wheel assembly.

Recessed region 86 in second flange 76 provides clearance to allow standoff 90 of retention member 84 to be selectively displaced toward valve stem body 58. Distal end 94 of standoff 90 may extend beyond an outermost peripheral edge 96 of second flange 76 when standoff 90 is in a first position, for example, as shown in FIG. 3. Standoff 90 may be disposed entirely within recess 86 of second flange 76, or at least a portion of standoff 90 may be arranged outside of recess 86 when the standoff 90 is in a second position, for example, as shown in FIG. 4. Distal end 94 of standoff 90 may be located at a first radial distance $R_1$ from longitudinal axis A-A when standoff 90 is arranged in the first position (FIG. 3), and may be located at a second radial distance $R_2$ from longitudinal axis A-A when arranged in the second position (FIG. 4). Second flange 76 may be configured such that outermost peripheral edge 96 is located at a radial distance $R_3$ (FIG. 3) from longitudinal axis A-A that is less than the radial distance $R_1$ at which distal end 94 of standoff 90 is located from longitudinal axis A-A when standoff 90 is arranged in the first position. With Standoff 90 arranged in the first position, radial distance $R_1$ between distal end 94 of standoff 90 and longitudinal axis A-A is greater than a radial distance $R_4$ between sidewall 72 of valve stem opening 70 and longitudinal axis A-A.

Standoff 90 and base member 88 may be made of common or dissimilar materials. Standoff 90, in particular, may be made from a generally elastic material to enable standoff 90 to flex and move relative to valve stem body 58, but which is more rigid than the material used for second flange 76.

Retention member 84 may be connected to valve stem body 58 using various methods. For example, in the exemplary valve stem configuration illustrated in FIGS. 1-5, retention member 84 is illustrated attached to valve stem body 58 by molding valve stem body 58 over base member 88. Other attachment mechanisms may also be employed.

Each retention member 84 may be configured as a separate part that may be individually attached to valve stem body 58. One or more retention members 84 may alternatively be interconnected, for example, by banding together base members 88 of the respective retention members. Each base member 88 and the band interconnecting the base members may be molded into valve stem body 58 in a manner similar to that illustrated in the drawing figures, or attached to valve stem 38 using another suitable connection method.

With reference to FIG. 4, valve stem 38 may be attached to wheel 16 by inserting valve stem body 58 through valve stem opening 70 in wall 39 from inside wheel 16. This may be accomplished by positioning air transfer end 62 of valve stem 38 adjacent valve stem opening 70 from the inner surface 41 side of rim 14 and inserting air transfer end 62 through valve stem opening 70 from inside wheel 16, followed by second flange 76 of grommet 68 and retention member 84. Standoff 90 may be configured to have sufficient length to contact a lip 77 on second flange 76 and push the lip in a generally downward direction as standoff 90 moves toward the second position within recessed region 86 to facilitate installation of valve stem 38 to rim 14. Alternatively, the length of standoff 90 may be short enough to clear lip 77 when moving toward the second position, but long enough to contact outer surface 43 of rim 14 after minimal movement of valve stem 38 toward the interior region 36 of tire 12 (see for example, FIG. 5). Second flange 76, being made from a generally resilient elastic material, may be compressed as second flange 76 passes through valve stem opening 70. Second flange 76 generally expands to its original configuration once it has cleared valve stem opening 70, for example, as illustrated in FIG. 3. Similarly, standoff 90 of retention member 84, being at least partially made from a generally resilient elastic material, pivots toward base member 88 as retention member 84 passes through valve stem opening 70 (second position shown in FIG. 4). Standoff 90 springs back toward its original position (first position), for example, as illustrated in FIG. 3, when distal end 94 of the standoff clears the edge of valve stem opening 70 adjacent outer surface 43 of rim 14. First flange 74 engages inner surface 41 of rim 14 when grommet 68 of valve stem 38 is fully seated within valve stem opening 70 to prevent valve stem 38 from being pushed entirely through valve stem opening 70. With rim 14 seated within groove 78 of grommet 68, first flange 74 is positioned adjacent inner surface 41 of rim 14 and second flange 76 is positioned adjacent outer surface 43 of rim 14.

Figure 5:
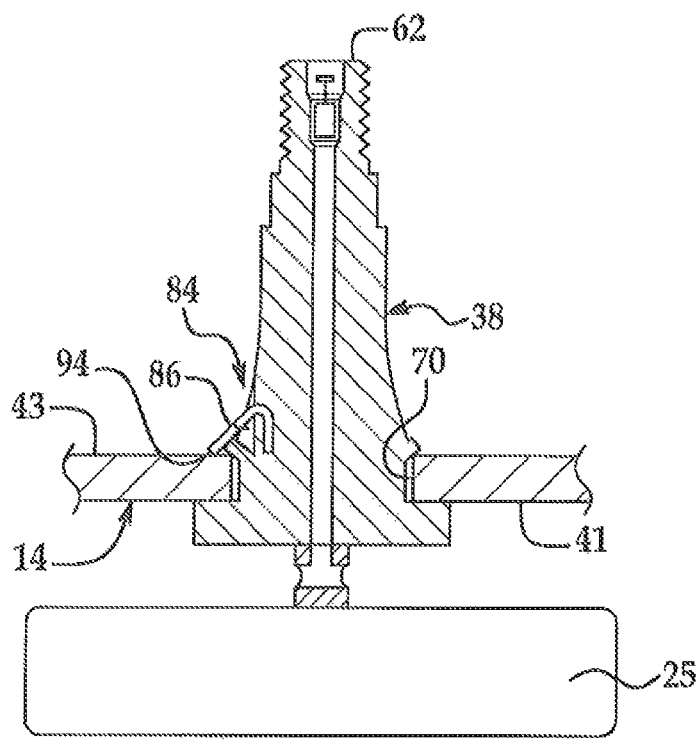
FIG. 5 is partial cross-sectional view of the exemplary valve stem of FIG. 2 illustrating operation of the wheel assembly, with the retention member limiting movement of the valve stem.

With reference to FIGS. 2, 3 and 5, retention member 84 operates to provide support for valve stem 38 to help minimize movement of valve stem 38 relative to rim 14 when operating the vehicle. Rotation of wheel 16 imposes a centrifugal force 98 on TPMS pressure sensor 25, which may tend to cause slight movement of valve stem 38 within valve stem opening 70. Under certain operating conditions, such as, for example, cold ambient temperatures and high vehicle speeds, the movement may briefly allow air from within tire 12 (see FIG. 1) to escape past grommet 68 of valve stem 38. Retention member 84 may prevent this from occurring by limiting movement of valve stem 38 within valve stem opening 70. For example, movement of valve stem 38 may cause distal end 94 of retention member 84 to engage outer surface 43 of rim 14, thereby limiting movement of valve stem 38 relative to wheel 16 and the likelihood of pressurized air escaping tire 12.

Figure 6:
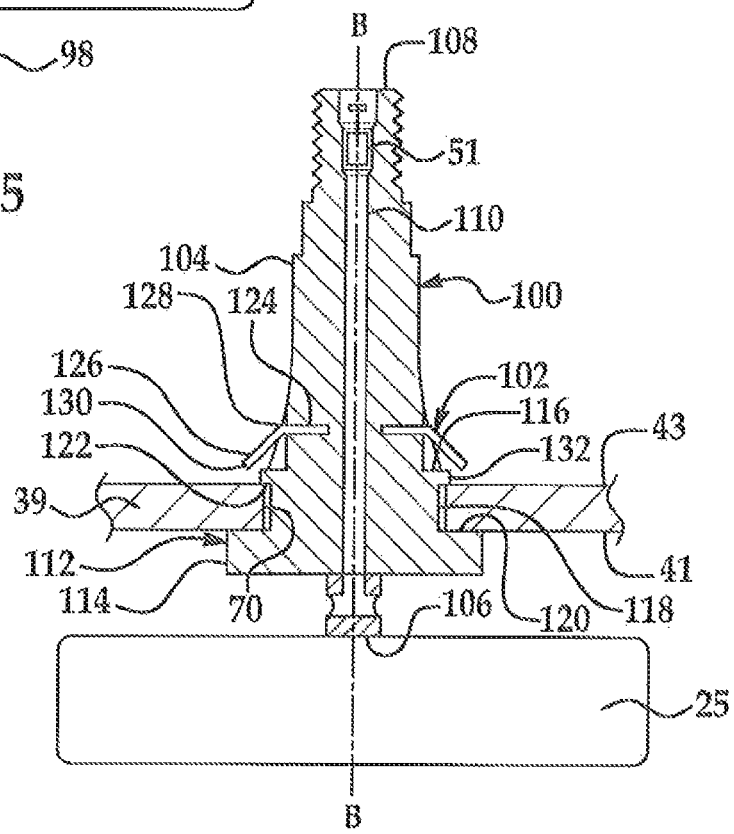
FIG. 6 is a partial cross-sectional view of a valve stem employing an alternately configured retention member.

With reference to FIG. 6, a valve stem 100 may include an alternatively configured retention member 102. Valve stem 100 may be similarly configured as valve stem 38, and may include, for example, a valve stem body 104 having an attachment end 106 and an air transfer end 108 arranged at opposite ends of valve stem body 104. A fluid passage 110 extends longitudinally through valve stem body 104 between attachment end 106 and the air transfer end 108. Disposed within fluid passage 110 is valve 51. A grommet 112 may be provided for attaching valve stem 100 to valve stem opening 70 in wall 39 of rim 14. Grommet 112 forms a substantially airtight seal between valve stem body 104 and wall 39 of rim 14 to prevent pressurized air from escaping interior region 36 (see FIG. 1) of tire 12.

Grommet 112 may include a pair of opposing flanges that engage inner and outer surfaces 41 and 43 of wall 39 for securing valve stem 100 to rim 14. A first flange 114 may be positioned proximate attachment end 106 and a second flange 116 may be positioned longitudinally along a longitudinal axis B-B of valve stem body 104 between first flange 114 and air transfer end 108. Flanges 114 and 116 extend generally radially outward from valve stem body 104. Flanges 114 and 116 are separated from one another and define opposite sides of a circumferential groove 118 extending around a perimeter of valve stem body 104 for receiving wall 39 of rim 14. A surface 120 of first flange 114 engages inner surface 41 of rim 14 and a surface 122 of second flange 116 engages outer surface 43 of wall 39 when grommet 112 is fully seated within valve stem opening 70. Grommet 112 may be made from a generally flexible resilient material to enable grommet 112 to elastically conform to the contour of wheel wall 39.

With continued reference to FIG. 6, retention member 102 may include a base member 124 attached to valve stem body 104 at a location between surface 122 of second flange 116 and air transfer end 108 of valve stem body 104. Base member 124 extends generally radially outward from valve stem body 104. Base member 124 may be aligned generally perpendicular to longitudinal axis B-B of valve stem 100. Extending from base member 124 is a standoff 126 having a proximal end 128 attached to base member 124 and an opposite distal free end 130. Proximal end 128 of standoff 126 is arranged axially along longitudinal axis B-B between distal end 130 of standoff 126 and air transfer end 108 of valve stem body 104. Standoff 126 may extend at an oblique angle from base member 124 so as to be angled toward first flange 114 and away from air transfer end 108 of valve stem 100. Distal end 130 of standoff 126 may extend beyond an outermost peripheral edge 132 of second flange 116. Retention member 102 may be made from a generally elastic material to enable the retention member to flex and move relative to valve stem body 104, but which is more rigid than the material used for second flange 116.

Retention member 102 may be connected to valve stem body 104 using various methods. For example, in the exemplary valve stem configuration illustrated in FIG. 6, retention member 102 is illustrated attached to valve stem body 104 by molding valve stem body 104 over base member 124. Other attachment mechanisms may also be employed.

Valve stem 100 may be attached to wheel 16 by inserting valve stem body 104 through valve stem opening 70 in wall 39 from inside wheel 16. This may be accomplished by positioning air transfer end 108 of valve stem 100 adjacent valve stem opening 70 and inner surface 41 of rim 14, and inserting air transfer end 108 through valve stem opening 70 from inside wheel 16, followed by second flange 116 of grommet 112 and retention member 102. Second flange 116, being made from a generally resilient elastic material, may be compressed as second flange 116 passes through valve stem opening 70. Second flange 116 generally expands to its original configuration once the flange clears valve stem opening 70. Similarly, retention member 102, being made from a generally resilient elastic material, may be compressed inward toward longitudinal axis B-B of valve stem 100 as retention member 102 passes through valve stem opening 70. Retention member 102 springs back toward its original position when distal end 130 of standoff 126 clears the edge of valve stem opening 70 along outer surface 43 of rim 14. First flange 114 engages inner surface 41 of rim 14 when grommet 112 of valve stem 100 is fully seated within valve stem opening 70 to prevent valve stem 100 from being pushed entirely through valve stem opening 70 (first position). With rim 14 connected to grommet 112, first flange 114 is positioned adjacent inner surface 41 of rim 14 and second flange 116 is positioned adjacent outer surface 43 of rim 14.

Retention member 102 operates in a manner similar to retention member 84, by providing support for valve stem 100 to help minimize movement of valve stem 100 relative to rim 14 when operating the vehicle. For example, distal end 130 of retention member 102 may engage outer surface 43 of rim 14 to limit the amount of movement of valve stem 100 relative to rim 14, thereby minimizing the likelihood of pressurized air escaping tire 12.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The foregoing description relates to what is presently considered to be the most practical embodiment. It is to be understood, however, that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A valve stem for a tire pressure monitoring system sensor, the valve stem comprising:
   a valve stem body including an attachment end connectable to the tire pressure monitoring system sensor, an opposite air transfer end, and a longitudinal axis;
   a grommet attached to the valve stem body, the grommet including a first flange and a second flange, each flange extending radially outward from the valve stem body, the first flange disposed between the second flange and the attachment end of the valve stem body, and the second flange having an outer peripheral edge; and
   a retention member attached to the valve stem body and comprising a base member and a standoff extending from the base member, the standoff including a proximal first end attached to the base member and an opposite distal second end, the standoff being selectively moveable relative to the outer peripheral edge of the second flange between a first position in which the distal second end is disposed at a first radial distance from the longitudinal axis of the valve stem body, and a second position in which the standoff is disposed at a second radial distance from the longitudinal axis of the valve stem body, the first radial distance being greater than the second radial distance, and the outer peripheral edge of the second flange is disposed at a maximum third radial distance from the longitudinal axis that is less than the first radial distance.

2. The valve stem of claim 1, wherein the second flange defines a recessed region, and the distal second end of the standoff is disposed within the recessed region when the standoff is in the second position.

3. The valve stem of claim 2, wherein substantially the entire standoff is located outside the recessed region when the standoff is in the first position.

4. The valve stem of claim 1, wherein the distal second end of the standoff is outside the outer peripheral edge of the second flange when the standoff is in the first position.

5. The valve stem of claim 1, wherein the standoff is biased toward the first position.

6. The valve stem of claim 1, wherein the proximal first end of the standoff is located at a first axial distance from the first flange that is greater than a second axial distance between the distal second end of the standoff and the first flange.

7. The valve stem of claim 1, wherein the base member extends substantially parallel to the longitudinal axis of the valve stem body.

8. The valve stem of claim 1, wherein the base member extends radially outward relative to the longitudinal axis of the valve stem body.

9. The valve stem of claim 1, wherein the base member is integrally molded with the second flange.

10. A tire pressure monitoring system assembly comprising:
    a rim for supporting a tire, the rim including an inner surface and an opposite outer surface, and the rim defining a valve stem opening extending from the inner surface to the outer surface;
    a tire pressure monitoring system sensor located proximate the inner surface of the rim;
    a valve stem body including an attachment end connected to the tire pressure monitoring system sensor, an opposite air transfer end, and a longitudinal axis;
    a grommet attached to the valve stem body, the grommet including a first flange and a second flange, each flange extending radially outward from the valve stem body, the first flange disposed between the second flange and the attachment end of the valve stem body, and the second flange having an outer peripheral edge; and
    a retention member attached to the valve stem body and comprising a base member and a standoff extending from the base member, the standoff including a proximal first end attached to the base member and an opposite distal second end, the standoff being selectively moveable relative to the outer peripheral edge of the second flange between a first position in which the distal second end is disposed at a first radial distance from the longitudinal axis of the valve stem body, and a second position in which the standoff is disposed at a second radial distance from the longitudinal axis of the valve stem body, the first radial distance being greater than the second radial distance, and the outer peripheral edge of the second flange is disposed at a maximum third radial distance from the longitudinal axis that is less than the first radial distance.

11. The tire pressure monitoring system assembly of claim 10, wherein the second flange defines a recessed region, and the distal second end of the standoff is disposed within the recessed region when the standoff is in the second position.

12. The tire pressure monitoring system assembly of claim 11, wherein substantially all of the standoff is disposed outside the recessed region when the standoff is in the first position.

13. The tire pressure monitoring system assembly of claim 10, wherein the first radial distance is greater than a fourth radial distance between the longitudinal axis of the valve stem body and a sidewall of the valve stem opening when the standoff is in the first position.

14. The tire pressure monitoring system assembly of claim 10, wherein the distal second end of the standoff is disposed outside the outer peripheral edge of the second flange when the standoff is in the first position.

15. The tire pressure monitoring system assembly of claim 10, wherein the standoff is biased toward the first position.

16. The tire pressure monitoring system assembly of claim 10, wherein the proximal first end of the standoff is located at a first axial distance from the first flange that is greater than a second axial distance between the distal second end of the standoff and the first flange.

17. The tire pressure monitoring system assembly of claim 10, wherein the distal second end of the standoff engages the outer surface of the rim when the valve stem body moves relative to the valve stem opening.

* * * * *